(12) United States Patent
Kaplan

(10) Patent No.: US 7,389,244 B2
(45) Date of Patent: Jun. 17, 2008

(54) METHOD AND SYSTEM FOR PROVIDING TRAVEL SERVICES

(76) Inventor: Donald Kaplan, 5831 Grey Rock Rd., Agoura Hills, CA (US) 91301

( * ) Notice: Subject to any disclaimer, the term of this patent is extended or adjusted under 35 U.S.C. 154(b) by 395 days.

(21) Appl. No.: 10/826,499

(22) Filed: Apr. 16, 2004

(65) Prior Publication Data

US 2005/0234748 A1 Oct. 20, 2005

(51) Int. Cl.
*G06Q 99/00* (2006.01)
(52) U.S. Cl. ......................................................... 705/1
(58) Field of Classification Search ...................... 705/1
See application file for complete search history.

(56) References Cited

U.S. PATENT DOCUMENTS

| | | | |
|---|---|---|---|
| 5,948,040 A * | 9/1999 | DeLorme et al. ............. | 701/201 |
| 5,966,068 A | 10/1999 | Wicks et al. ............ | 340/286.01 |
| 6,326,918 B1 | 12/2001 | Stewart ....................... | 342/457 |
| 6,609,658 B1 | 8/2003 | Sehr ............................ | 235/384 |
| 2001/0028561 A1 * | 10/2001 | Pitts ............................ | 362/84 |
| 2001/0052142 A1 * | 12/2001 | Marcon ......................... | 2/102 |
| 2002/0077871 A1 * | 6/2002 | Udelhoven et al. .............. | 705/5 |
| 2002/0112003 A1 * | 8/2002 | Glorikian .................... | 709/203 |
| 2003/0055689 A1 * | 3/2003 | Block et al. ...................... | 705/5 |
| 2005/0154621 A1 * | 7/2005 | Birkhead et al. ................ | 705/5 |

OTHER PUBLICATIONS

Document entitled "Using Iridium—Products and Services" from www.iridium.com.
Document entitled "Satellite Telephone Quality of Service Comparison: Iridium vs. Globalstar", Copyright 2002 Frost & Sullivan.
Document entitled "Globalstar Remote Communications" from Globalstar web site.
Document entitled "Globalstar Data Services" from Globalstar web site.
Document entitled "Globalstar Satellite Phones Quick Connect Guide" from Globalstar web site.

* cited by examiner

*Primary Examiner*—Jonathan Ouellette
(74) *Attorney, Agent, or Firm*—Jeffer Mangels Butler & Marmaro LLP

(57) ABSTRACT

A method and system for providing travel services are disclosed. The method and system include a database of travel information from which information can be selectively obtained based on the traveler's circumstances. The method and system also include a system for providing counseling services and an emergency kit containing food, water and other supplies. A mobile communications device is also provided to enable the traveler to transmit his or her location in order to initiate the dispatch of a rescue services provider to transport the traveler to a location of greater safety.

41 Claims, 14 Drawing Sheets

Figure 2

MAIN MENU

Traveler's Name                    | Smith, John |  70

Traveler's Location                | Warsaw, Poland |  80

Select Desired Menu

| Service Providers | 100 | Regional Legal Info | 150 |
| Regional Weather | 110 | Vaccinations | 160 |
| Traffic Information | 120 | Safe Havens | 161 |
| Road Construction | 130 | Do's and Dont's | 162 |
| Terror Alerts | 140 | | |

Service Provider Menu

| Transportation | 180
| Lodging | 190
| Medical | 200
| Banks | 210
| Rescue | 211

| Dental | 220

Rental Car

Hertz  321     123 First St. 322  207-723-4510  323
               Warsaw Poland
               47QX23

Avis           456 Second St.     207-652-0141
               Warsaw Poland
               7X34M2

Traffic Information - Warsaw, Poland

Highway 10  331    Clear    332
Highway 20         Delays - Accident

Regional Weather - Warsaw, Poland

| | | |
|---|---|---|
| Temperature (°C) | 342 | 10 °C |
| Skies | 343 | Cloudy |
| Precipitation | 344 | None |
| Humidity | 345 | 40 % |
| Expected High | 346 | 19 °C |
| Expected Low | 347 | 5 °C |

Regional Legal Information - Warsaw, Poland

| Police Stations | 360

| Traffic Laws | 370

| Courts | 380

Suggested Vaccinations - Warsaw, Poland

Influenza    400

Mumps

Measles

Terror Alerts - Warsaw Poland

STATUS: WARNING 420

ADVISE TO AVOID MAIN STREET DUE 422
TO BOMB THREAT

Safe Havens - Warsaw, Poland

Public School 101  451   481 117th St.  452   207-410-3764  453
                        Warsaw, Poland
                        47M P23

Hyatt Regency           110 118th St.          207-418-520D
                        Warsaw, Poland
                        47M P23

Do's and Dont's - Warsaw, Poland

Note 1
Avoid 117th street at Elm - Known drug corridor. Take 118th or 119th street

461

Note 2
Avoid Oak street near 11th Ave. Possible gang activity

December 23, 2003
21:50

METHOD AND SYSTEM FOR PROVIDING TRAVEL SERVICES

FIELD OF THE INVENTION

The present invention relates to a method and system for providing travel services.

BACKGROUND OF THE INVENTION

Travelers frequently encounter a wide variety of difficulties or situations for which they need assistance. Many of these difficulties or situations are not foreseeable to the traveler. For example, travelers may find that their lodging accommodations are suddenly unavailable or unsuitable, requiring them to obtain suitable replacement accommodations. If the traveler is in an unfamiliar location, as is frequently the case, this task can be quite difficult.

Similarly, travelers may find that their transportation arrangements have been disrupted by mechanical failures, labor disruptions, or overbooking. In such situations, the traveler is also faced with the task of finding suitable alternate transportation. Medical problems can also arise while traveling, forcing travelers to locate a doctor, nurse, hospital or clinic in his or her geographic location which can attend to his or her problem. In addition, travelers will generally be unfamiliar with local sources of information or news, such as television, radio or newspapers, and may not have sufficient understanding of the local language to rely on such sources. As a result, the traveler may face difficulties in obtaining information needed to ensure a safe and enjoyable journey. Thus, a need has developed for a method and system for providing travel services which addresses the foregoing problems.

SUMMARY OF THE PREFERRED EMBODIMENTS

In accordance with one aspect of the present invention, a method of providing travel services to a person traveling to a geographic location is provided. According to the method, a database of travel information is provided. The database includes identification information for one or more service providers, and further includes weather information, traffic information, road construction information, terrorism information, legal information and suggested vaccinations. Preferably, information from the database can be retrieved and displayed based on the geographic location to which it pertains. It is especially preferred that the database is operatively coupled to a computer terminal adapted to display information from the database. Techniques for configuring databases which can be sorted based on the contents of one for the database fields, for example, geographic location, are known.

Preferably, the service providers included in the database include transportation service providers, banking service providers, lodging service providers, rescue service providers, medical service providers and dental service providers. In a preferred embodiment, the identification information for the service providers includes name, phone number, and address information. In other preferred embodiments, the database is operatively coupled to a computer network, and even more preferably to the internet.

According to the method, counseling services are preferably provided, wherein a traveler is provided with information selected from the database of travel information based on the traveler's circumstances and geographic location. In preferred embodiments, the traveler is provided with a phone number for accessing the counseling services. More preferably, the traveler is provided with a mobile phone that can be used to call the phone number. Even more preferably, the mobile phone includes a button for transmitting the traveler's geographic location. In other preferred embodiments, a rescue service provider is dispatched in response to the depression of the button and transports the traveler from his or her current geographic location to a location of greater safety. In still other preferred embodiments, the traveler is provided with a password, which is provided to the rescue service provider to allow confirmation of the traveler's identity.

In a preferred embodiment, an internet web site is provided. The website is configured to receive information concerning the traveler's geographic location and circumstances. The web site is operatively coupled to a database of travel information and configured to display information from it.

In other preferred embodiments, a voice mail system is provided. The voice mail system is adapted to record and store messages provided by the traveler and is also configured to play back messages to those using a phone number provided for accessing the system.

In still other preferred embodiments, an emergency kit including food and water is provided. In additional preferred embodiments, the emergency kit includes first aid supplies. In yet other preferred embodiments, the traveler is provided with protective clothing adapted for use in the geographic location to which the traveler will be traveling.

In accordance with another aspect of the present invention, a system for providing travel services is provided. In a preferred embodiment, the system comprises a database of travel information which includes identification information for one or more service providers, and further includes weather information, traffic information, road construction information, terrorism information, legal information and suggested vaccinations. Preferably, information from the database can be retrieved and displayed based on the geographic location to which it pertains. It is especially preferred that the database be operatively coupled to a computer terminal adapted to display information from the database. The system further includes a system for providing counseling services, wherein a traveler is provided with information selected from the database of travel information based on the traveler's circumstances and geographic location. Preferably, the service providers included in the database include transportation service providers, banking service providers, lodging service providers, medical service providers, rescue service providers and dental service providers. More preferably, the identification information for the service providers includes name, address, and phone number information.

In a preferred embodiment, the database is operatively coupled to a computer network. In other preferred embodiments, the system includes a website coupled to a database of travel information and configured to display information from it.

The system further includes a system for providing counseling services, wherein a traveler is provided with information selected from the database of travel information based on the traveler's circumstances and geographic location. In preferred embodiments, the system includes a phone number for accessing the counseling services. More preferably, the system includes a mobile communications device, which even more preferably is a mobile phone that can be used to call the phone number. It is especially preferred that the mobile phone is a satellite phone that includes a button for transmitting the traveler's geographic location. In other preferred embodiments, a rescue service provider is dispatched in response to the depression of the button and transports the traveler from his or her current geographic location to a location of greater safety. In still other preferred embodiments, the system includes a traveler password, which is provided to the rescue service provider to allow confirmation of the traveler's identity. In additional preferred embodiments, the traveler is provided with a portable personal computer that is adapted to transmit the geographic location of the traveler.

In other preferred embodiments, the system includes a voice mail system. The voice mail system is adapted to record and store messages provided by the traveler and is configured to play back the messages to those using a phone number provided for accessing them. A phone number is provided for accessing the system.

In still other preferred embodiments, the system includes an emergency kit comprising food and water. In additional preferred embodiments, the system includes protective clothing adapted for use in the geographic location to which the traveler will be traveling is provided.

BRIEF DESCRIPTION OF THE DRAWINGS

The invention may be more readily understood by referring to the accompanying drawings in which:

FIG. 2 is a depiction of a user screen for accessing a database of travel information in accordance with a preferred embodiment of the present invention.

FIG. 3 is a depiction of a user screen for accessing a database of travel information in accordance with a preferred embodiment of the present invention.

FIG. 4 is a depiction of a user screen for accessing a database of travel information in accordance with a preferred embodiment of the present invention.

FIG. 6 is a depiction of a user screen for accessing a database of travel information in accordance with a preferred embodiment of the present invention.

FIG. 7 is a depiction of a user screen for accessing a database of travel information in accordance with a preferred embodiment of the present invention.

FIG. 8 is a depiction of a user screen for accessing a database of travel information in accordance with a preferred embodiment of the present invention.

FIG. 9 is a depiction of a user screen for accessing a database of travel information in accordance with a preferred embodiment of the present invention.

FIG. 10 is a depiction of a user screen for accessing a database of travel information in accordance with a preferred embodiment of the present invention.

FIG. 11 is a depiction of a user screen for accessing a database of travel information in accordance with a preferred embodiment of the present invention.

FIG. 13 is a depiction of a user screen for accessing a database of travel information in accordance with a preferred embodiment of the present invention.

FIG. 14 is a depiction of a user screen for accessing a database of travel information in accordance with a preferred embodiment of the present invention.

DETAILED DESCRIPTION OF THE PREFERRED EMBODIMENTS

According to the present invention, a method and system of providing travel services is provided whereby the traveler is provided with a plurality of services. The services can be combined and arranged in a multitude of different ways, and the embodiments described herein are merely examples which are not intended to limit the scope of the claims in any way.

Figure 1:
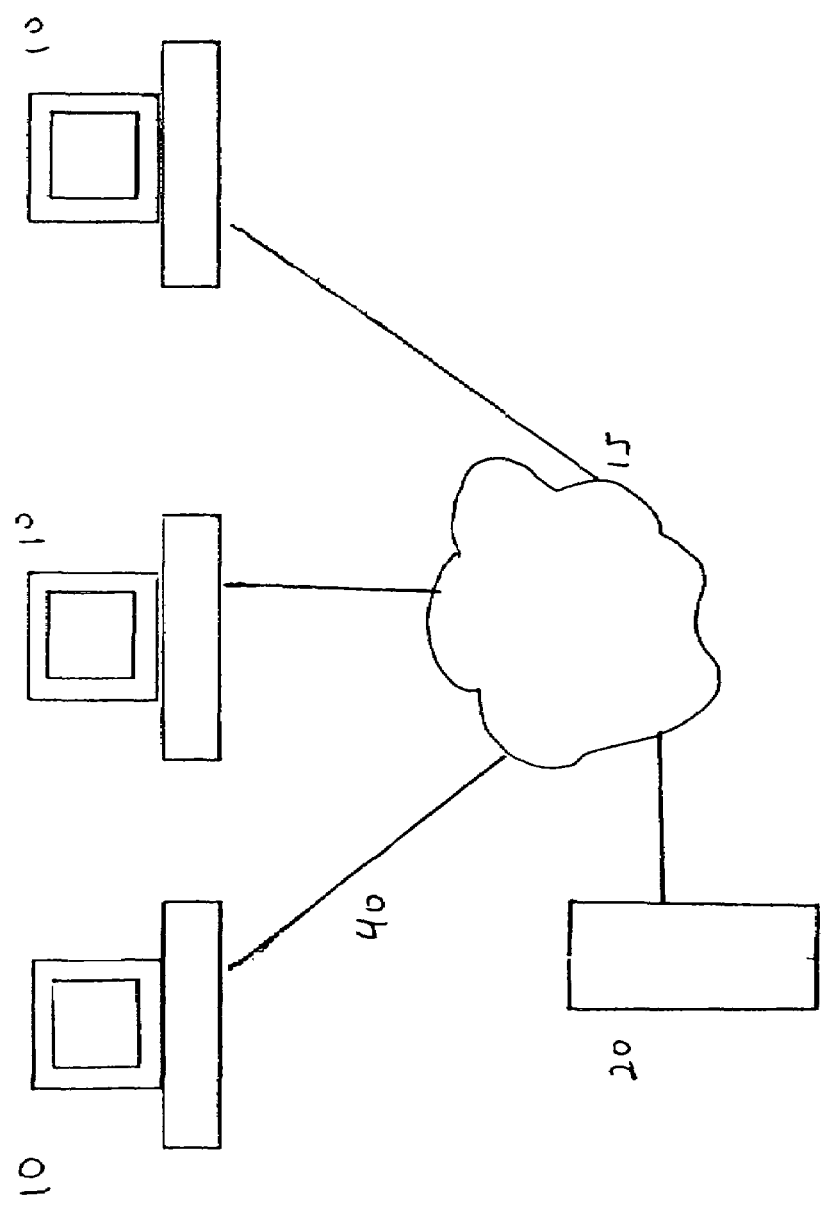
FIG. 1 is a depiction of a computer network in accordance with a preferred embodiment of the present invention.

In accordance with a first embodiment of the present invention, a database of travel information is provided. Preferably, the database is operatively coupled to a computer network 15, as best seen in FIG. 1. According to the Figure, a server 20 is operatively coupled to network 15 and stores and provides access to the database. One or more terminals 10 are operatively coupled to the server 20 by network connection 40. Instead of using a network, the database can also be stored in the memory of an individual computer or computers or on removable media. Server 20 is preferably an internet server that is operatively coupled to the internet, allowing terminals 10 to remotely access the database of travel information via the internet. A website can optionally be provided, enabling travelers with internet access to use the database while traveling.

In an especially preferred embodiment, selected information from the database of travel information is displayed on a computer terminal using a series of user screens, such as those shown in FIGS. 2 through 14. Techniques for programming computers to generate such screens are known. Any number of screen designs, layouts and sequences can be used without departing from the scope or spirit of the present invention. It is preferred that the database of travel information is updated at regular intervals.

FIG. 2 is a user screen displaying a main menu 60 for accessing the database of travel information. Main menu 60 includes data entry boxes, 70 and 80, for the traveler's name and geographic location. The database can optionally be configured to include information about the traveler's itinerary, such that when the traveler's name is entered into the traveler's name data entry box 70, the traveler's geographic location is automatically displayed in box 80. Date stamp 62 and time stamp 64 indicate the current time and date of the display.

FIG. 3 is a user screen displaying another menu 90 for accessing the database of travel information. A series of boxes are provided, which enable the user to select information based on the traveler's circumstances. The boxes can be selected using techniques that are known, such as the arrow and enter keys on a computer keyboard or with a computer mouse.

An example of how the user screens of FIGS. 2-14 can be used to access information from the database of travel information is as follows: Referring to FIG. 3, menu 90 allows the user to identify the desired category of information from the database by making a selection from boxes 100, 110, 120, 130, 140, 150, 160, 161 and 162.

The user selects box 100 to bring up a service provider menu 170, an embodiment of which is depicted in FIG. 4. From the service provider menu 170, the user can select from a variety of services. According to this embodiment, the services that can be selected are grouped into categories of transportation 180, lodging 190, medical 200, banks 210, rescue 211 and dental 220. Several types of lodging services can be included in the database, such as hotel services, motel services, and emergency shelter services. Medical services, such as physician services, hospital services, nursing services and medical clinic services can also be included.

Figure 5:
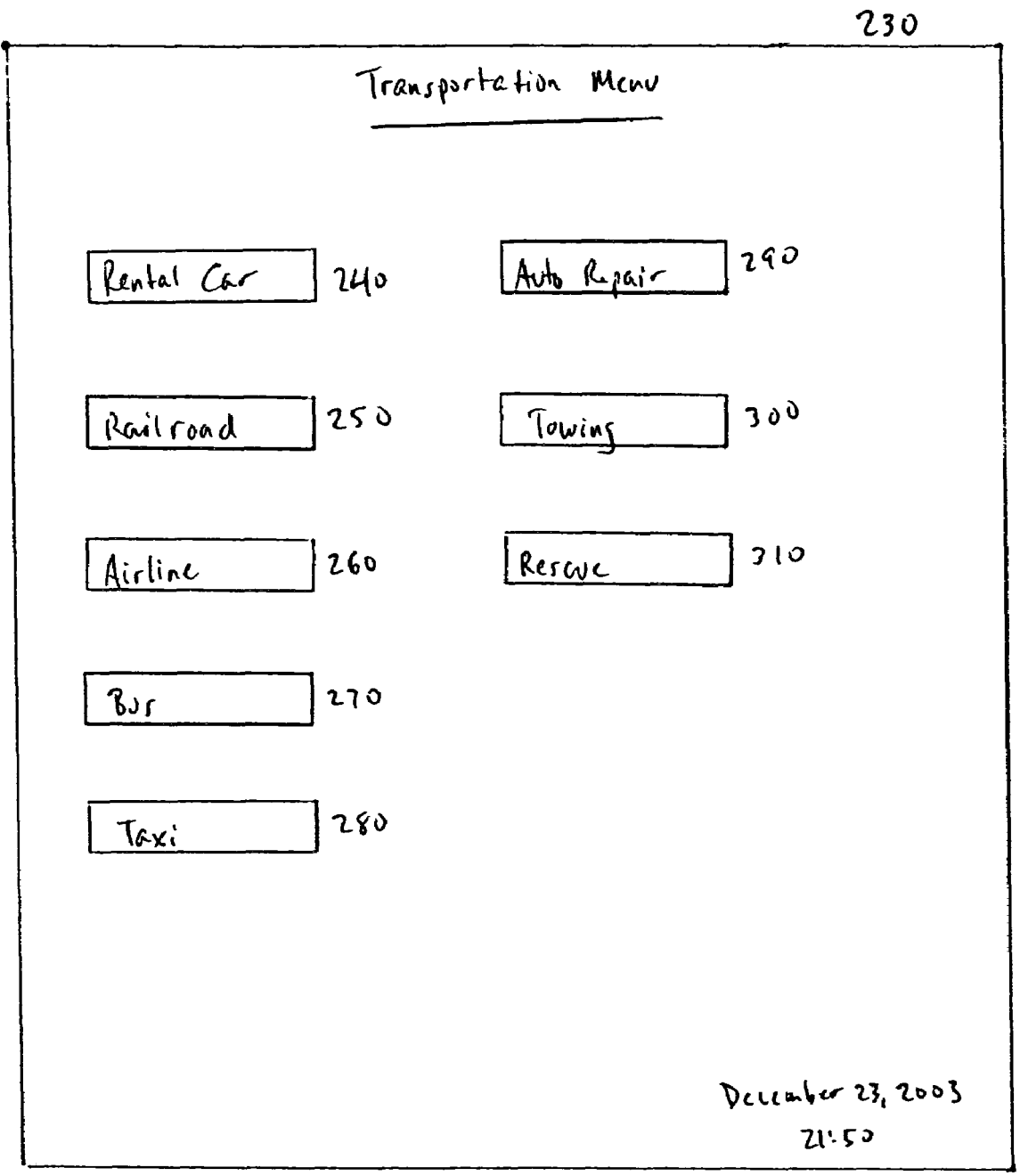
FIG. 5 is a depiction of a user screen for accessing a database of travel information in accordance with a preferred embodiment of the present invention.

In a preferred embodiment illustrated by FIG. 5, the selection of transportation box 180 from service provider menu 170 provides access to transportation service provider menu 230, as depicted in FIG. 5. According to the embodiment of FIG. 5, the categories of transportation service providers from which the user can choose are providers of rental cars 240, railroads 250, airlines 260, buses 270, taxis 280, automotive repair services 290, towing services 300 and rescue services 310.

As an example of the operation of the user screens of this embodiment, the user can select rental car box 240 from transportation service provider menu 230, thereby bringing up a list of rental car providers as shown in FIG. 6. The list of rental car providers is retrieved from the database of travel information based on the geographic location entered in box 80 on main menu 60, shown in FIG. 2. Techniques for programming databases to sort and retrieve information based on a particular variable, such as geographic location, are known. As shown in FIG. 6, name information 321, address information 322 and phone number information 323 are provided on rental car service provider display 320. Although not shown in separate figures, according to this embodiment, information for categories of transportation providers other than rental car providers is displayed using a similar configuration of user screens, as is information for the other categories of service providers shown in FIG. 4. However, other configurations of user screens can be used for accessing and displaying information from the database of travel information without departing from the scope and spirit of the present invention.

FIG. 7 depicts a traffic information display 330. The display 330 identifies particular thoroughfares 331 and provides a description of the traffic condition 332 on them. The user accesses display 330 by selecting traffic information box 120 from menu 90, as shown in FIG. 3.

FIG. 8 depicts a regional weather screen 340. Screen 340 displays the weather conditions for the traveler's geographic location 80. The regional weather screen 340 is accessed by selecting regional weather information box 110 from menu 90. Screen 340 displays temperature information 342, sky information 343, precipitation information 344, humidity information 345, expected high temperature information 346, and expected low temperature information 347 for the traveler's geographic location 80.

As shown in FIG. 9, a regional legal information display 350 is accessed by selecting the regional legal information box 150 from menu 90 of FIG. 3. In the embodiment of FIG. 9, information concerning police stations 360, traffic laws 370 and courts 380 can be accessed for the traveler's geographic location by selecting the desired box.

As shown in FIG. 10, a list of suggested vaccinations 390 is provided for the traveler's geographic location. A series of entries 400 identifies the suggested vaccinations. List 390 is accessed by selecting vaccination box 160 from menu 90.

FIG. 11 shows a user screen for displaying terror alert information for the traveler's geographic location. Terror alert screen 410 provides a status 420 and a descriptor 422. Terror alert screen 410 is accessed by selecting terror alert box 140 from menu 90, as shown in FIG. 3.

Figure 12:
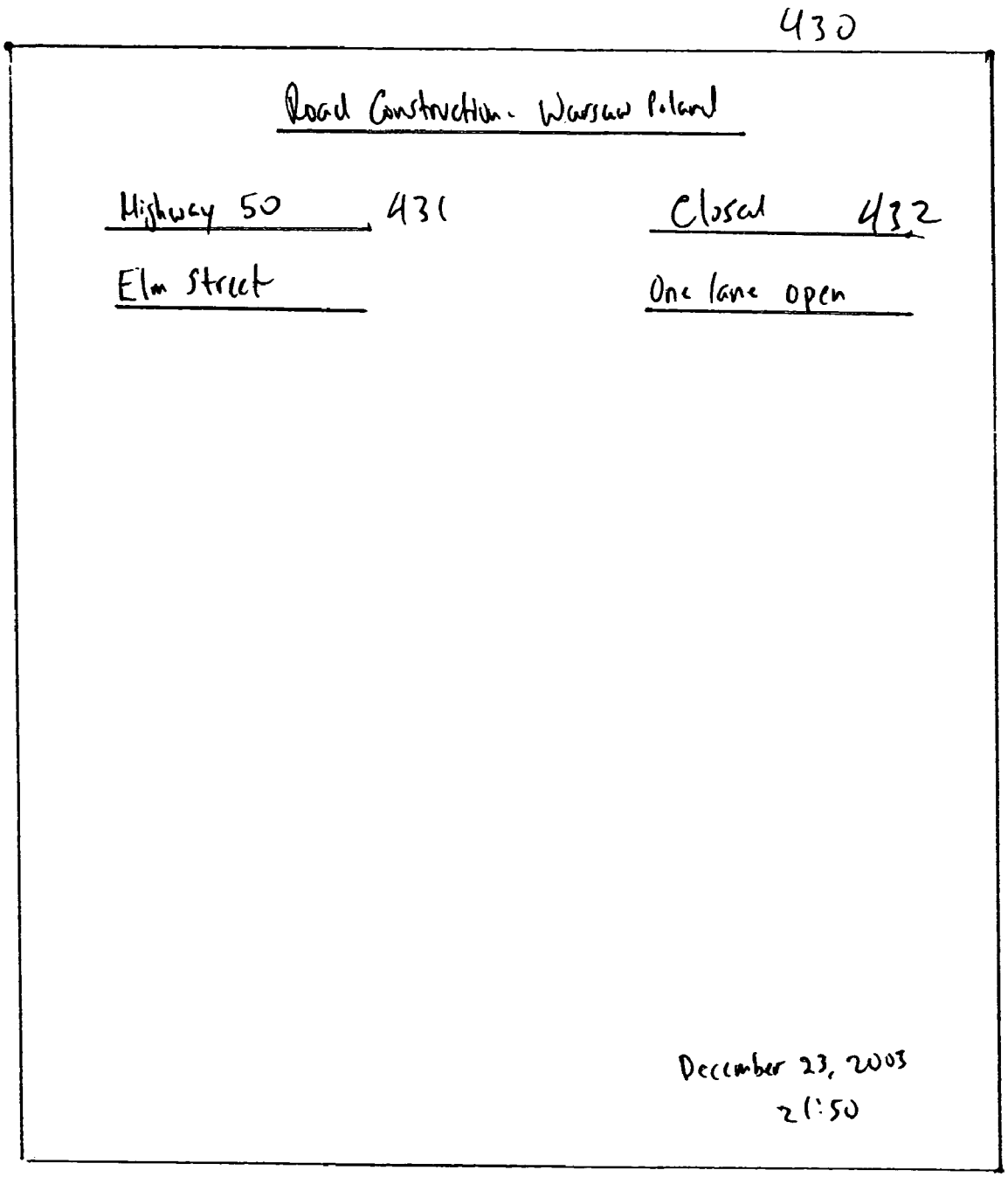
FIG. 12 is a depiction of a user screen for accessing a database of travel information in accordance with a preferred embodiment of the present invention.

FIG. 12 depicts a user screen for displaying road construction information for the traveler's geographic location. As shown in the figure, road construction screen 430 includes thoroughfare descriptor 431 and road construction information descriptor 432. Road construction screen 430 is accessed by selecting road construction box 130 from menu 90, as shown in FIG. 3.

FIG. 13 depicts a user screen for displaying safe haven information. As shown in the figure, safe haven screen 450 includes safe haven descriptors 451, along with corresponding addresses 452 and telephone numbers 453. The safe havens are preferably locations where the traveler can seek temporary refuge during incidents that pose a threat to the traveler's well-being, such as natural disasters, terrorist activities or criminal activities. The information described in the safe haven screen 450 is preferably updated as such incidents occur. Safe haven screen 450 is accessed by selecting safe haven box 161 from menu 90, as shown in FIG. 3.

FIG. 14 depicts a user screen for displaying advice to travelers. As shown in the figure, Do's and Don'ts screen 460 includes a series of notes, each of which are displayed in a box 461. Box 461 includes recommendations as to actions that the traveler should or should not take in the geographic location of interest. Do's and Don't's screen 460 is accessed by selecting Do's and Don't box 162 from menu 90, as shown in FIG. 3.

In a second embodiment of the present invention, a system of counseling services is provided. According to this embodiment, the traveler provides information concerning his or her geographic location and circumstances and is provided with selected information based on the geographic location and circumstances. Preferably, the selected information is obtained by performing a selected retrieval of information from a database of travel information using geographic location as a selection criterion. As explained previously, the selection and retrieval process can be facilitated by the use of user screens such as those provided in FIGS. 2-14. In a more preferred embodiment, the traveler is provided with a phone number that he or she can call to access the counseling services. Even more preferably, the traveler is provided with a mobile communication device, which the traveler can use to place the call.

It is particularly preferred that the mobile communications device is a mobile satellite phone. Examples of known, mobile satellite phones are the Qualcomm Globalstar GSP 1600 Tri-Mode phone distributed by Globalstar LP of San Jose, Calif. and the 9500 Portable Satellite Phone distributed by Iridium Satellite LLC of Arlington, Va. In an especially preferred embodiment, the mobile satellite phone has a button that the user can depress to transmit his current location. Known techniques such as global positioning systems (GPS) can be used to transmit the traveler's location to a receiving unit, such as a computer configured to communicate with the GPS.

In an especially preferred embodiment, a rescue service provider is dispatched to the traveler's location in response to the transmission of the traveler's location with the button. The mobile phone may be configured to communicate directly with the rescue service provider, or it may be configured to communicate with a third party, for example a travel services provider, who then contacts the rescue service provider. After arriving at the traveler's geographic location, the rescue service provider then transports the traveler to an area of greater safety. According to this embodiment, the traveler can optionally be provided with an identification card with his or her picture, name and address or with a password, allowing the rescue service provider to confirm his or her identity.

Alternatively, the mobile communications device may comprise a personal computer configured to operate as a telephone. Preferably, the personal computer is a hand-held, wireless, notebook-style personal computer that is adapted to transmit the current location of the traveler and to send and receive text messages.

According to a preferred embodiment of the present invention, the traveler is provided with an emergency kit containing food and water. Preferably, the food and water are sufficient to sustain the traveler for a period of three days. More preferably, the emergency kit includes a mobile satellite phone (as described above), a carrying case, a water purifier, a candle, a hand and foot warmer, a light stick, a fire starting device (such as matches and/or a lighter), a blanket, one or more tools, a small flashlight, information regarding survival techniques, tissue, utility bags, a radio, a whistle, and a mobile communications device battery recharger. It is especially preferred that the emergency kit further include first aid information and first aid supplies, such as adhesive bandages, adhesive tape, alcohol wipes, aspirin, first aid cream, gauze pads, gauze roll, razor blades, and towels.

The kits can optionally be tailored to particular categories of traveler, geographic location or travel activities, such as backpacking kits, excursion kits, cosmopolitan kits, urban travel kits, marine travel kits, rural kits, wilderness kits, and special medical needs kits.

According to yet another preferred embodiment of the present invention, a voice mail system is provided. The voice mail system is configured to record and store messages provided by the traveler. Friends, relatives, co-workers and other persons concerned about the traveler's condition are provided with a phone number for accessing the traveler's voice mail messages, allowing them to obtain updates concerning his or her condition.

According to still another embodiment of the present invention, the traveler is provided with protective clothing adapted to the geographic location to which he will travel. For example, coats or other warm clothing can be provided to those traveling to particularly cold climates or hats designed to reduce sun exposure could be provided to those visiting particularly sunny climates.

The foregoing embodiments are merely examples of the present invention. Those skilled in the art may make numerous uses of, and departures from, such embodiments without departing from the spirit and the scope of the present invention. Accordingly, the scope of the present invention is not to be limited to or defined by such embodiments in any way, but rather, is defined solely by the following claims.

What is claimed is:

1. A method for providing travel services to a person traveling to a geographic location, comprising:
  a. providing a database including travel information, weather information, traffic information, road construction information, terrorism information, suggested safety tip information, legal information and suggested vaccinations pertaining to one or more geographic locations, wherein any of said information can be selectively retrieved from said database based on the geographic location to which it pertains;
  b. providing counseling services, wherein said providing counseling services comprises receiving information regarding said traveler's circumstances and geographic location, a automatically retrieving information from said database based on said traveler's circumstances and geographic location, and providing said information to said traveler; and
  c. accessing information from said database at a specific geographic location using a computer terminal, wherein information pertaining to said specific geographic location is automatically uploaded to said computer, and wherein said geographic location specific information includes travel information, weather information, traffic information, road construction information, terrorism information, suggested safety tip information, legal information and suggested vaccinations.

2. The method of claim 1, wherein said database includes identification information for one or more service providers.

3. The method of claim 1, wherein said services include transportation services, banking services, lodging services, medical services, and dental services.

4. The method of claim 3, wherein said transportation services comprise rental car services, railroad services, rescue services, airline services, bus services, taxi services, automotive repair services, and towing services.

5. The method of claim 3, wherein said lodging services comprise hotel services, motel services, and emergency shelter services.

6. The method of claim 3, wherein said medical services comprise physician services, hospital services, nursing services, and medical clinic services.

7. The method of claim 2, wherein said identification information comprises name, phone number, and address information.

8. The method of claim 1, further comprising providing a phone number, wherein said traveler accesses said counseling services by calling said phone number.

9. The method of claim 1, further comprising providing an internet web site, wherein said web site is configured to receive information concerning said traveler's circumstances and geographic location, and wherein said web site is operatively coupled to said database of travel information and configured to display said travel information.

10. The method of claim 1, further comprising providing said traveler with an emergency kit, said emergency kit comprising food and water.

11. The method of claim 1, further comprising providing said traveler with a mobile phone including a button configured to transmit the geographic location of said traveler upon depression of said button.

12. The method of claim 11, wherein in response to a depression of said button of said mobile phone, a provider of rescue services is dispatched to said geographic location of said traveler, whereupon said traveler is transported by said provider of rescue services from said geographic location to a location of greater safety.

13. The method of claim 12, further comprising providing said traveler with a password, wherein prior to said transporting of said traveler by said provider of rescue services, said traveler provides said password to said provider of rescue service.

14. The method of claim 1, further comprising providing said traveler with protective clothing adapted for use in said geographic location.

15. The method of claim 1, further comprising providing a computer network to which said database is operatively coupled.

16. The method of claim 1, wherein said database is operatively coupled to a computer terminal adapted to display said travel information from said database.

17. The method of claim 9, wherein said website is configured to provide said traveler with access to said database of travel information.

18. The method of claim 1, further comprising a voice mail system adapted to record and store messages provided by said traveler and further adapted to play back said messages, said voice mail system being accessible by calling a voice mail system telephone number.

19. The method of claim 1, wherein in response to a request from said traveler, a provider of rescue services is dispatched to said geographic location of said traveler, whereupon said traveler is transported from said geographic location to a location of greater safety.

20. A system for providing travel services to a person traveling to a geographic location, comprising:
   a. a database including travel information, weather information, traffic information, road construction information, terrorism information, suggested safety tip information, legal infomation and suggested vaccinations pertaining to one or more geographic locations, wherein any of said information can be selectively retrieved from said database based on the geographic location to which it pertains;
   b. a system for providing counseling services, wherein said providing counseling services comprises receiving information regarding said traveler's circumstances and said traveler's geographic location, automatically retrieving information from said database based on said traveler's circumstances and said traveler's geographic location and providing said information to said traveler; and
   c. a system for allowing said traveler access to information from said database at a specific geographic location using a computer terminal, wherein information pertaining to said specific geographic location is automatically uploaded to said computer, and wherein said geographic location specific information includes travel information, weather information, traffic information, road construction information, terrorism information, suggested safety tip information, legal information and suggested vaccinations.

21. The system of claim 20, wherein said database includes identification information for one or more service providers.

22. The system of claim 21, wherein said service providers provide services including transportation services, banking services, lodging services, medical services, and dental services.

23. The system of claim 22, wherein said transportation services comprise rental car services, railroad services, rescue services, airline services, bus services, taxi services, automotive repair services, and towing services.

24. The system of claim 22, wherein said lodging services comprise hotel services, motel services, and emergency shelter services.

25. The system of claim 22, wherein said medical services comprise physician services, hospital services, nursing services, and medical clinic services.

26. The system of claim 20, wherein said database is operatively coupled to a computer network.

27. The system of claim 20, wherein said identification information comprises name, phone number, and address information.

28. The system of claim 20, further comprising a phone number, wherein said traveler accesses said counseling services by calling said phone number.

29. The system of claim 20, further comprising an internet web site, wherein said web site is configured to receive information concerning said traveler's circumstances and geographic location, and wherein said web site is operatively coupled to said database of travel information and configured to display said travel information.

30. The system of claim 20, further comprising an emergency kit, said emergency kit comprising food and water.

31. The system of claim 20, further comprising a mobile phone including a button configured to transmit the geographic location of said traveler upon depression of said button.

32. The system of claim 31, wherein in response to a depression of said button of said mobile phone, a rescue services provider is dispatched to said geographic location of said traveler, whereupon said traveler is transported by said rescue service provider from said geographic location to a location of greater safety.

33. The system of claim 20, further comprising a password, wherein prior to said transporting of said traveler by said rescue service provider, said traveler provides said password to said rescue service provider.

34. The system of claim 20, further comprising protective clothing adapted for use in said geographic location.

35. The system of claim 20, further comprising providing a computer network to which said database is operatively coupled.

36. The system of claim 20, wherein said database is operatively coupled to a computer terminal adapted to display said travel information from said database.

37. The system of claim 29, wherein said website is configured to provide said traveler with access to said database of travel information.

38. The system of claim 20, further comprising a voice mail system adapted to record and store messages provided by said traveler and further adapted to play back said messages, said voice mail system being accessible by calling a voice mail system telephone number.

39. The system of claim 38, wherein in response to a request from said traveler, a rescue services provider is dispatched to said geographic location of said traveler, whereupon said traveler is transported from said geographic location to a location of greater safety.

40. A method of providing travel services to a person traveling to a geographic location, comprising:
   a. associating with one or more service providers, said services comprising transportation services, banking services, lodging services, medical services, and dental services;
   b. providing said traveler with an identification card including the name and address of said traveler and a photograph of said traveler;
   c. providing said traveler with a password;
   d. providing said traveler with an emergency kit, said emergency kit comprising food and water;
   e. providing said traveler with a mobile phone including a button configured to transmit the geographic location of said traveler upon depression of said button;
   f. providing a first telephone number;
   g. providing said traveler with protective clothing adapted for use in said geographic location;
   h. providing a database of travel information, said travel information pertaining to one or more geographic locations, said database comprising the names, addresses and phone numbers of said service providers, weather information, traffic information, road construction information, terrorism information, suggested safety tip information, legal information, and suggested vaccinations, wherein said travel information can be selectively retrieved from said database based on the geographic location to which it pertains, and wherein said database is further operatively coupled to a computer terminal adapted to display said travel information from said database;

i. providing a voice mail system adapted to record and store messages provided by said traveler, and further adapted to play back said messages;

j. providing a second phone number for accessing said messages provided by said traveler;

k. providing an internet web site, wherein said web site is configured to receive information concerning said traveler's real-time circumstances and geographic location, wherein said web site is operatively coupled to said database of travel information and configured to display weather information, traffic information, road construction information, terrorism information, suggested safety tip information, legal information, and suggested vaccinations pertaining to said traveler's geographic location;

l. providing counseling services to said traveler, wherein said providing counseling services comprises receiving information regarding said traveler's geographic location and circumstances, selecting information from said database based on said traveler's geographic location and circumstances, and providing said selected information to said traveler, wherein said traveler accesses said counseling services by at least one of calling said first telephone number or by transmitting a request for said counseling services via said web site;

m. wherein in response to a request from said traveler or a depression of said button of said mobile phone, a rescue service provider is dispatched to said geographic location of said traveler, whereupon said rescue services provider arrives at said location, said traveler provides said password to said rescue service provider, and said traveler is transported by said rescue service provider from said geographic location to a location of greater safety;

n. wherein said transportation services comprise rental car services, railroad services, rescue services, airline services, bus services, taxi services, automotive repair services, and towing services;

o. wherein said lodging services comprise hotel services, motel services, and emergency shelter services; and p. wherein said medical services comprise physician services, hospital services, nursing services, and medical clinic services.

41. A system for providing travel services to a person traveling to a geographic location, comprising:

a. a mobile phone including a button configured to transmit to the receiving unit the geographic location of said traveler upon depression of said button;

b. a traveler identification system, comprising a traveler identification card including the name and address of said traveler and a photograph of said traveler;

c. a system of service providers, said services comprising transportation services, banking services, lodging services, medical services, and dental services;

d. a first telephone number;

e. a password assigned to said traveler;

f. a computer network;

g. a database of travel information, said travel information pertaining to one or more geographic locations, said database comprising the names, addresses and phone numbers of said service providers, weather information, traffic information, road construction information, terrorism information, suggested safety tip information, legal information, and suggested vaccinations, wherein said travel information can be selectively retrieved from said database based on the geographic location to which it pertains, and wherein said database is further operatively coupled to a computer terminal adapted to display said travel information from said database;

h. an internet web site operatively coupled to said database of travel information, wherein said web site is configured to receive information concerning said traveler's circumstances and geographic location, and is further configured display weather information, traffic information, road construction information, terrorism information, suggested safety tip information, legal information, and suggested vaccinations pertaining to to said traveler's geographic location;

i. a voice mail system adapted to record and store messages provided by said traveler and further adapted to play back said messages, said voice mail system being accessible by calling a second telephone number;

j. a system for providing counseling services, wherein said providing counseling services comprises receiving information regarding said traveler's circumstances, selecting information from said database based on said circumstances, and providing said selected information to said traveler, wherein said traveler accesses said counseling services by calling said first phone number or by transmitting a request for said counseling services via said web site;

k. wherein in response to a request from said traveler or a depression of said button of said mobile phone, a rescue service provider is dispatched to said geographic location of said traveler, whereupon said rescue services provider arrives at said location, said traveler provides said password to said rescue service provider, and said traveler is transported by said rescue service provider from said geographic location to a location of greater safety;

l. wherein said transportation services comprise rental car services, railroad services, rescue services, airline services, bus services, taxi services, automotive repair services, and towing services;

m. wherein said lodging services comprise hotel services, motel services, and emergency shelter services; and n. wherein said medical services comprise physician services, hospital services, nursing services, and medical clinic services.

* * * * *